United States Patent
Yamamoto et al.

(10) Patent No.: US 8,050,370 B2
(45) Date of Patent: *Nov. 1, 2011

(54) DIGITAL SIGNAL RECEIVING APPARATUS

(75) Inventors: Tomohiro Yamamoto, Anjo (JP); Akira Furuhashi, Takahama (JP); Takahiro Horie, Nagoya (JP); Yuichi Murakami, Chiryu (JP); Kazunori Ono, Tokai (JP); Frederic Coutant, Grasse (FR); Tarik Aouine, Valbonne (FR)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 458 days.

This patent is subject to a terminal disclaimer.

(21) Appl. No.: 12/270,394

(22) Filed: Nov. 13, 2008

(65) Prior Publication Data

US 2009/0129523 A1      May 21, 2009

(30) Foreign Application Priority Data

Nov. 15, 2007   (EP) ..................................... 07120789

(51) Int. Cl.
*H04B 1/10*    (2006.01)
(52) U.S. Cl. ........................................................ 375/350
(58) Field of Classification Search .................. 375/334, 375/343, 346, 350
See application file for complete search history.

(56) References Cited

U.S. PATENT DOCUMENTS

| | | | |
|---|---|---|---|
| 2007/0201588 A1 | 8/2007 | Loiseau et al. | |
| 2009/0129520 A1* | 5/2009 | Yamamoto et al. | 375/343 |

FOREIGN PATENT DOCUMENTS

| | | |
|---|---|---|
| FR | 2 859 336 A1 | 3/2005 |
| JP | 2001-4736 A | 1/2001 |
| JP | 2005-45314 A | 2/2005 |

* cited by examiner

*Primary Examiner* — David C. Payne
*Assistant Examiner* — Leon-Viet Nguyen
(74) *Attorney, Agent, or Firm* — Sughrue Mion, PLLC

(57) ABSTRACT

A digital signal receiving apparatus includes a detection-judging portion having a first smoothing filter generating a first smoothed signal by smoothing an auto-correlation signal and judging a possible presence of a desired signal when a signal level of the first smoothed signal is greater than a reference level and an absence of the desired signal when being smaller than the reference level. The smoothing filter includes a limiting portion limiting a fluctuation width of the first smoothed signal; and an adjusting portion configured to adjust the fluctuation width of the first smoothed signal limited by the limiting portion to be reduced while an elapsing time after the detection-judging means judges the possible presence of the desired signal is increasing.

4 Claims, 5 Drawing Sheets

DIGITAL SIGNAL RECEIVING APPARATUS

CROSS REFERENCE TO RELATED APPLICATION

This application is based on and claims priority under 35 U.S.C 119 to European Patent Application No. 07120789.8 filed on Nov. 15, 2007, the entire of which is incorporated herein by reference.

FIELD OF THE INVENTION

The present invention relates to a digital signal receiving apparatus.

BACKGROUND

A known digital signal receiving apparatus is disclosed in Japanese Patent No. 2001-4736A (hereinafter, referred to as reference 1, see FIG. 4) for example. FIG. 5 is a block diagram illustrating a general configuration related to a digital signal receiving apparatus 70 disclosed in the reference 1. As illustrated therein, the digital signal receiving apparatus 70 receives a desired signal S contained with a correlated noise signal N as an ambient noise, by an antenna 71. Then, the digital signal receiving apparatus 70 down-converts the received signal to a desired frequency band at a high-frequency processing portion 72. Further, the digital signal receiving apparatus 70 generates a corresponding digital signal (S"+N") by converting the signal from analog to digital at an A/D converting portion 73 and outputs the digital signal to a noise-filtering unit 74.

In addition, the digital signal receiving apparatus 70 receives the noise signal N by means of another antenna 75. Then, the digital signal receiving apparatus 70 down-converts the received noise signal N to a desired frequency band at a high-frequency processing portion 77 of a reference noise signal-output portion 76. Further, the digital signal receiving apparatus 70 generates a reference noise signal Nr, which is correlated to the noise signal N, by converting the signal N from analog to digital at an A/D converting portion 78, and outputs the digital signal to the noise-filtering unit 74.

The noise-filtering unit 74 generates a noise cancel signal AN via an adaptive filtering-portion 79 on the basis of the reference noise signal Nr, and filters out the noise signal N by adding the digital signal (S"+N") inputted from the antenna 71 to the noise cancel signal AN at an adder 80. A filter coefficient of the adaptive filtering portion 79 is successively updated so that the noise signal N (N") is reduced to a minimum by the filter coefficient updating portion 81.

However, according to the digital signal receiving apparatus 70 of the reference 1, the antenna 75 and the reference noise signal-output portion 76 (the high-frequency processing portion 77 and the A/D converting portion 78) are required for receiving the noise signal N, thus leading to an increase of a size of a circuit. In this case, it is necessary not to input a desired signal S to the antenna 75. In other words, if the desired signal S is inputted to the second antenna 75, the desired signal S may be also generated as the noise cancel signal AN at the adaptive filtering portion 79 and the desired signal S may sometimes be filtered our or removed.

Another digital signal receiving apparatus has been proposed in Japanese Patent No. 2005-45314A (hereinafter, referred to as reference 2, see FIG. 1). The reference numerals described below related to Reference 2 are depicted in FIG. 1 of Reference 2. The digital signal receiving apparatus according to the reference 2 includes an adaptive filter (17), filter controlling means (18c) and demodulating means (18d). The adaptive filter (17) includes an adaptive mode and a non-adaptive mode. In the adaptive mode, a filter coefficient is successively updated and an ambient noise is filtered out in a signal-receiving standby state for receiving a desired signal. In the non-adaptive mode, updating of the filter coefficient is stopped in a signal-receiving state for receiving the desired signal. The filter controlling means (18c) controls switching of the adaptive mode and the non-adaptive mode of the adaptive filter (17). The demodulating means (18d) demodulates an output (correlation signal) of the adaptive filter (17) and generates a demodulated signal. The adaptive filter (17) includes an adaptive filter portion (17a, 17b) and a filter coefficient-updating portion (17c, 17d). At the adaptive filter portion (17a, 17b), the filter coefficient is changed in accordance with a change of the ambient noise in the signal-receiving standby state. The filter coefficient updating portion (17c, 17d) successively updates the filter coefficient of the adaptive filter portion (17a, 17b) so as to reduce the ambient noise to a minimum. When detecting means (18) judges a possible presence of a desired signal in a situation where the apparatus is in a signal-receiving standby state, the filter controlling means switches the adaptive filter from an adaptive mode to a non-adaptive mode so as to stop updating the filter coefficient.

In such a case, in the signal-receiving standby states the adaptive filter successively updates the filter coefficient and filters the ambient noise, reacting to the adaptive mode. On the other hand, in the signal-receiving state for receiving the desired signal, the adaptive filter stops updating the filter coefficient reacting to the non-adaptive mode. In other words, in the non-adaptive mode, the adaptive filter filters the ambient noise by use of the filter coefficient updated for filtering the ambient noise in the adaptive mode. Accordingly, in the signal-receiving state for receiving the desired signal, even when the ambient signal and the desired signal have a correlation, the ambient signal is filtered by the adaptive filter and the desired signal is received appropriately. In addition, even when the ambient signal and the desired signal have a correlation, the ambient signal and the desired signal can be selectively received because the filter controlling means controls the switching of the adaptive mode and the non-adaptive mode. Accordingly, the size of the circuit can be reduced in comparison with a configuration of the circuit in which the ambient signal and the desired signal are separately received.

However, in this type of digital signal receiving apparatus, in a signal receiving state for receiving a desired signal, when a pulse-shaped interfering wave is contained, a correlation output (an error signal e2) of the adaptive filter, which contains therein a pulse-shaped interfering wave, is inputted to a detection-judging portion. In this case, the detection-judging portion may not judge detection accurately even in a signal receiving state, and may judge there is an absence of a detection of a desired signal. Here, because the adaptive filter is not accurately controlled (switching control between an adaptive mode and a non-adaptive mode), the adaptive filter erroneously learns a desired signal as an ambient noise, thereby disabling to demodulate a desired signal accurately.

A need thus exists for providing a digital signal receiving apparatus, which can accurately judge a detection of a desired signal and prevent an adaptive filter from erroneously learning a desired signal even when a pulse-shaped interfering wave is contained.

SUMMARY OF THE INVENTION

According to an aspect of the present invention, a digital signal receiving apparatus includes: an adaptive filter receiving a signal and adapted to switch between an adaptive mode for updating successively a filter coefficient thereof and for filtering out a correlated ambient noise from the signal by use of the filter coefficient and a non-adaptive mode for discontinuing updating of the filter coefficient and for filtering out the correlated ambient noise from the signal by use of the filter coefficient updated in the adaptive mode; a signal processing portion generating an auto-correlation signal based upon the received signal from which the correlated ambient noise is filtered out by the adaptive filter; a detection-judging portion having a first smoothing filter generating a first smoothed signal by smoothing the auto-correlation signal the detection-judging portion judging a possible presence of the desired signal in the signal when a signal level of the first smoothed signal is greater than a reference level and an absence of a desired signal in the signal when the signal level of the smoothed signal is smaller than the reference level and a filter controlling portion switching an actual mode of the adaptive filter from the adaptive mode to the non-adaptive mode when the detection-judging portion judges the possible presence of the desired signal and switching the actual mode of the adaptive filter from the non-adaptive mode to the adaptive mode when the detection-judging portion judges the absence of the desired signal. The smoothing filter includes: a limiting portion limiting a fluctuation width of the first smoothed signal and an adjusting portion configured to adjust the fluctuation width of the first smoothed signal limited by the limiting portion to be reduced while an elapsing time after the detection-judging means judges the possible presence of the desired signal is increasing.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention is described herein with reference to FIGS. 1, 2, 3 and 4.

Figure 1:
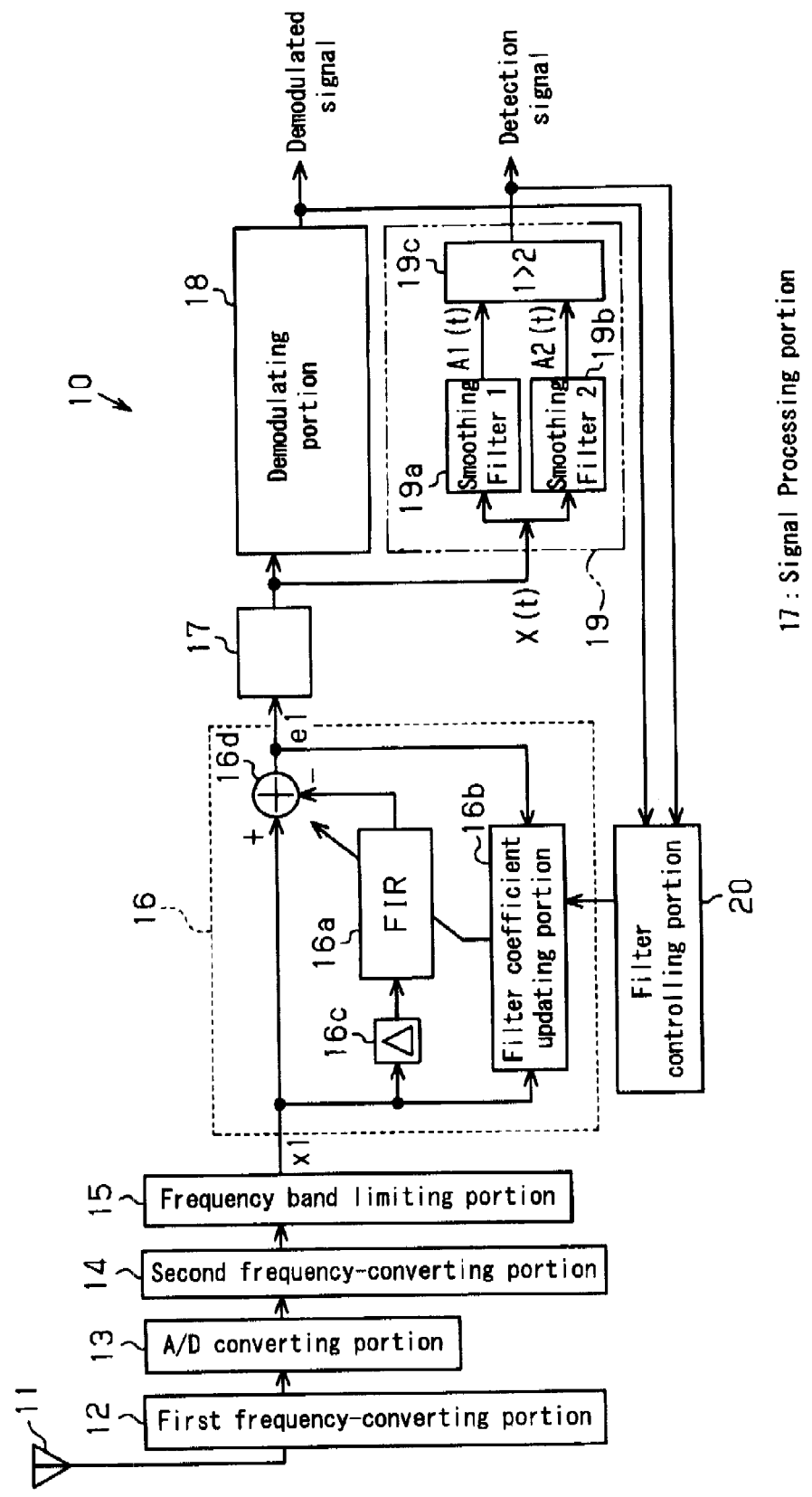
FIG. 1 is a block view illustrating a digital signal receiving apparatus according to an embodiment.

FIG. 1 is a block view illustrating a system of an FSK (Frequency shift Keying) digital signal receiving apparatus 10. The FSK digital signal receiving apparatus 10 is configured to receive a signal, for example, transmitted from a transmitter carried by a user. The signal is hereinafter referred to as a desired signal. The FSK digital signal receiving apparatus 10 is switched between operation modes, which are a signal-receiving state, in which the apparatus 10 receives the desired signal, and a signal-receiving standby state, in which the apparatus 10 is in a standby state for receiving the desired signal.

As illustrated in FIG. 1, the FSK digital signal receiving apparatus 10 incorporates therein an antenna 11, a first frequency-converting portion 12, an A/D converting portion 13, a second frequency-converting portion 14, a frequency band limiting portion 15, an adaptive noise-filtering unit 16, a signal-processing portion 17, a demodulating portion 18, a detecting portion 19, and a filter controlling portion 20.

The antenna 11 is structured basically to be inputted with a desired signal. Therefore, when the FSK digital signal receiving apparatus 10 is in the signal-receiving state, the antenna 11 is inputted with an ambient noise as well as the desired signal. However, when the FSK digital signal receiving apparatus 10 is in the signal-receiving standby state, the antenna 11 is inputted with an ambient noise.

The first frequency-converting portion 12 converts a frequency of a signal emitted from the antenna 11 and generates an intermediate-frequency signal to be outputted to the A/D converting portion 13. The A/D converting portion 13 converts the signal outputted by the first frequency-converting portion 12 from an analog form to a digital form and generates a discrete digital signal. The A/D converting portion 13 outputs the discrete digital signal to the second frequency-converting portion 14,.

The second frequency-converting portion 14 converts a frequency of the discrete digital signal outputted by the A/D converting portion 13 and generates a base band signal to be outputted to the frequency-band limiting portion 15. The frequency-band limiting portion 15 limits a frequency band of the base band signal outputted by the second frequency-converting portion 14 and generates a bandlimited signal. The frequency-band limiting portion 15 Her outputs the bandlimited signal as a received signal X1 to the adaptive noise-filtering unit 16, which received signal X1 may contain at least one ambient noise component as a noise signal.

The adaptive noise-filtering unit 16 is configured as an adaptive filter for reducing a correlated noise from among the ambient noise. The adaptive noise-filtering unit 16 includes an adaptive filtering portion 16a, of which a filter coefficient is variable and adapted in response to the change in the received signal X1, and a filter coefficient updating portion 16b, which successively updates the filter coefficient of the adaptive filtering portion 16a so as to filter out a correlated noise from the received signal X1 when the FSK digital signal receiving apparatus 10 is in the signal-receiving standby state.

In the adaptive noise-filtering unit 16, the received signal X1 transmitted by the frequency-band limiting portion 15 may be outputted to the adaptive filtering portion 16a via a delaying portion 16c so as to generate a signal. The received signal X1 and the signal generated via the delaying portion 16c are outputted to an error calculating portion 16d, so that an error signal of the received signal X1 and the signal generated via the delaying portion 16c is obtained or extracted by the error calculating portion 16d. The error calculating portion 16d outputs the error signal as an interfering-wave filtered signal e1. When the FSK digital signal receiving apparatus 10 is in a signal-receiving standby state for receiving a desired signal, the adaptive noise-filtering unit 16 outputs the interfering-wave filtered signal e1 to the filter coefficient updating portion 16b in addition to the received signal X1, thereby optimizing a characteristic of the adaptive filtering portion 16a (adaptive mode). The adaptive noise-filtering unit 16 outputs, to the signal-processing portion 17, a signal (interfering-wave filtered signal e1) generated by removing or filtering out a stable interfering-wave corresponding to a current operation condition, such as a correlated noise, from the received signal X1.

The signal-processing portion 17 is inputted with the interfering-wave filtered signal e1, i.e., a signal transmitted by the error calculating portion 16d of the adaptive noise-filtering unit 16, and then calculates an autocorrelation of the signal.

The signal-processing portion 17 then outputs a correlation signal X(t) as an auto-correlation signal to the demodulating portion 18 and the detecting portion 19.

The demodulating portion 18 demodulates a desired signal based upon a correlation signal X(t) outputted by the signal processing portion 17, so that a demodulated signal is generated. The demodulating portion 18 outputs the demodulated signal to the filter controlling portion 20 and a non-illustrated external circuit.

The detecting portion 19 includes a first smoothing filter 19a, which smoothes the correlation signal X(t) of the signal-processing portion 17 and generates a smoothed signal A1(t) (first smoothed signal), a second smoothing filter 19b, which smoothes the correlation signal X(t) at a convergence speed slower than that of the first smoothing filter 19a and generates a smoothed signal A2(t) (second smoothed signal, slow-speed smoothed signal), and a comparator 19c, which compares levels of the smoothed signals A1(t) and A2(t). When the level of the smoothed signal A1(t) is greater than that of the smoothed signal A2(t) (reference level), the comparator 19c outputs a first detection signal representing "judgment of a possible presence of a desired signal". Meanwhile, when the level of the smoothed signal A1(t) is smaller than that of the smoothed signal A2(t), the comparator 19c outputs a second detection signal representing "judgment of an absence of a desired signal". The detecting portion 19 outputs either the first detection signal or the second detection signal to the filter controlling portion 20 and the non-illustrated external circuit. Here, the first detection signal for "judgment of a possible presence of a desired signal" is outputted in a case where a desired signal is detected or in a case where a desired signal is possibly detected. The second detection signal for "judgment of an absence of a desired signal" is outputted in a case where a desired signal is not detected.

When the filter controlling portion 20 receives the first detection signal, which represents "judgment of a possible presence of a desired signal", the filter controlling portion 20 controls the filter coefficient updating portion 16b to discontinue updating the filter coefficient of the adaptive filtering portion 16a (non-adaptive mode). In this case, in the adaptive filtering portion 16a of the adaptive noise-filtering unit 16, the last filter coefficient determined immediately before receiving the first detection signal representing "judgment of a possible presence of a desired signal" is retained. Therefore, when the FSK digital signal receiving apparatus 10 is in a signal-receiving state for receiving a desired signal, the adaptive noise-filtering unit 16 outputs, to the signal-processing portion 17, the signal (interfering-wave filtered signal e1) generated by removing or filtering out a stable interfering-wave corresponding to a signal-receiving standby state, such as a correlated noise, from the received signal X1. The interfering-wave filtered signal e1 is outputted to the signal-processing portion 17.

When the filter-controlling portion 20 is not inputted with the first detection signal representing "judgment of a presence of a possible detection of a desired signal", the filters controlling portion 20 switches a current mode of the adaptive noise-filtering unit 16 from a non-adaptive mode to an adaptive mode. Further, the filter-controlling portion 20 receives a demodulated signal from the demodulating portion 18 as well as a first or second detection signal from the comparator 19c and judges, based upon the demodulated signal and the first or second detection signal, whether a signal being received is a desired signal. Therefore, not only when the filter-controlling portion 20 is not inputted with the aforementioned first detection signal, but also when the demodulated signal is not a desired signal, the adaptive noise-filtering unit 16 is switched from the non-adaptive mode to the adaptive mode.

That is, either when the filter controlling portion 20 is not transmitted with the first detection signal or when the signal being received it not a desired signal, the adaptive noise-filtering unit 16 is switched to an adaptive mode by the filter controlling portion 20. Here, the adaptive noise-filtering unit 16 resumes updating of a filter coefficient. In other words, the adaptive noise-filtering unit 16 is retained in the non-adaptive mode until the first detection signal representing "judgment of a possible presence of a desired signal" disappears in the filter-controlling portion 20 and/or until the signal being received is judged not to be a desired signal.

Next, described below is the first smoothing filter 19a according to the embodiment.

Figure 2:
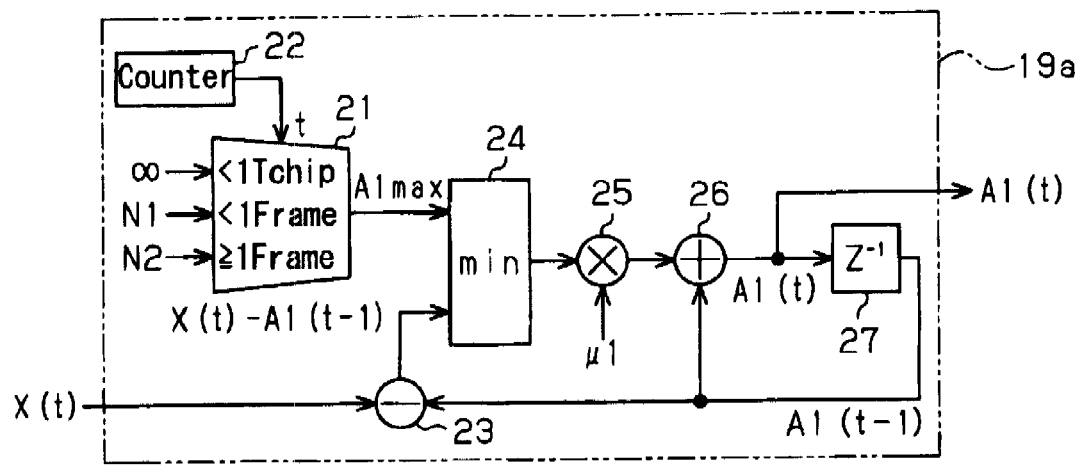
FIG. 2 is a block view illustrating a smoothing filter illustrated in FIG. 1.

FIG. 2 is a block view illustrating an electrical structure of the first smoothing filter 19a. The first smoothing filter 19a includes a selector 21 (adjusting portion), a counter 22, a subtractor 23, a limiter 24 (limiting portion), a multiplier 25, an adder 26 and a converter 27.

The selector 21 selects the maximum value A1max to be outputted thereby in response to a time t clocked by the counter 22, the clocking being started when the detecting portion 19 judges a possible presence of a desired signal. More specifically, when the time t is less than a predetermined time 1Tchip, the selector 21 outputs the maximum value A1max as "∞". The time 1Tchip is set based upon a time where a predetermined portion of a one-bit signal is completely outputted. When the time t is less than a predetermined time 1Frame (>1Tchip), the selector 21 outputs the maximum value A1max as a predetermined value N1. This predetermined time 1Frame is set based upon a time where for example a one-frame signal is completely outputted. When the time t is greater than, or equal to, the predetermined time IFrame, the selector 21 outputs the maximum value A1max as a predetermined value N2 (<N1). That is, the maximum value A1max, which is selected and outputted by the selector 21, is adjusted to be reduced in a stepped manner of multiple steps (in a multiple-stepped manner), for example three steps during an elapsing time, or as time elapses, after the detecting portion 19 judges a possible presence of a desired signal.

Meanwhile, the subtractor 23 is inputted with the correlation signal X(t) and a smoothed signal A1(t−1) of the last cycle, which smoothed signal A1(t−1) is obtained by the converter 27 delaying by one sample. The subtractor 23 outputs a difference signal therebetween represented as {X(t)−A1(t−1)}.

The limiter 24 is inputted with the maximum value A1max transmitted by the selector 21 and the difference signal {X(t)−A1(t−1)} transmitted by the subtractor 23. The limiter 24 outputs a signal min {X(t)−A1(t−1), A1max}, which is either the maximum value A1max or the difference signal {X(t)−A1(t−1)}, of which level is smaller than that of the other one. When the time t is smaller than the predetermined time 1Tchip, the limiter 24 outputs the difference signal {X(t)−A1(t−1)}, corresponding to a state where the maximum value A1max is "∞".

The multiplier 25 multiplies a signal of the limiter 24 by a smoothing coefficient μ1, and the multiplied signal is outputted to the adder 26. The adder 26 adds the smoothed signal A1(t−1) of the previous cycle to the multiplied signal, thereby generating a smoothed signal A1(t) of this cycle. The smoothed signal A1(t) of this cycle is outputted to the comparator 19c. The smoothed signal A1(t) of this cycle is further inputted to the converter 27 so as to be outputted as the smoothed signal A1(t−1) of the previous cycle.

The following equation (1) expresses the aforementioned smoothed signal A1(t) outputted by the first smoothing filter 19a, $$A1(t) = A1(t-1) + \mu1 \cdot \min\{X(t) - A1(t-1), A1\max\} \quad (1)$$

$$A1\max = \infty \quad (t < 1Tchip)$$
$$= N1 \quad (1Tchip \le t < 1Frame)$$
$$= N2 \quad (t \ge 1Frame, N2 < N1).$$

As is apparent from the equation (1), when the time t is greater than, or equal to, the predetermined time 1Tchip, in the first smoothing filter 19a, the limiter 24 implements minimization so as to limit the upper limit of a fluctuation width (X(t)−A1(t−1)) of the smoothed signal A1(t) to the maximum value A1max. The maximum value A1max is set to a value appropriate for restraining a sudden change in the level of the smoothed signal A1(t) based upon a pulse-shaped interfering wave contained.

The following equation (2) expresses a smoothed signal A2(t) outputted by a second smoothing filter 19b, $$A2(t) = A2(t-1) + \mu2 \cdot \{X(t) - A2(t-1)\} \quad (2),$$

Here, $\mu2$ is smaller than $\mu1$.

Figure 4:
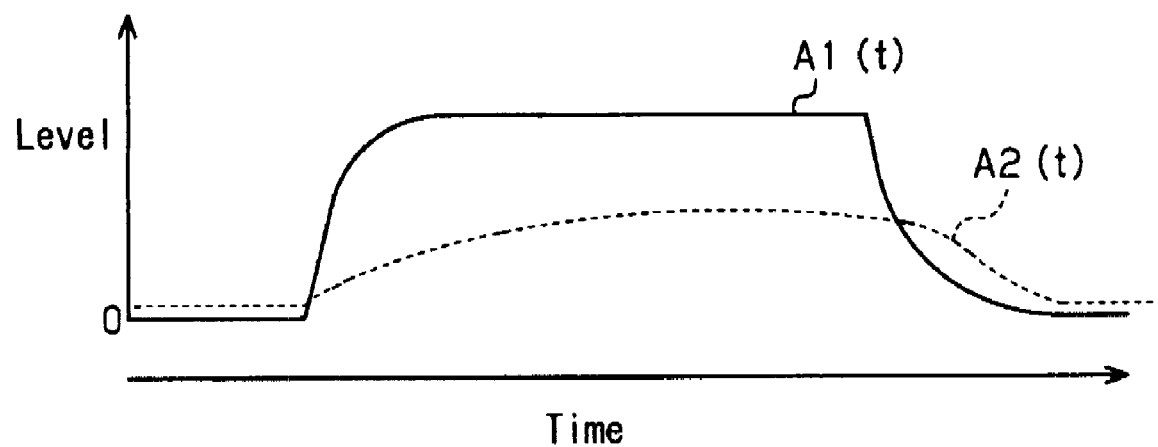
FIG. 4 is a timechart illustrating one example for explaining a transit of a smoothed signal over a period of time according to the embodiment.
Figure 5:
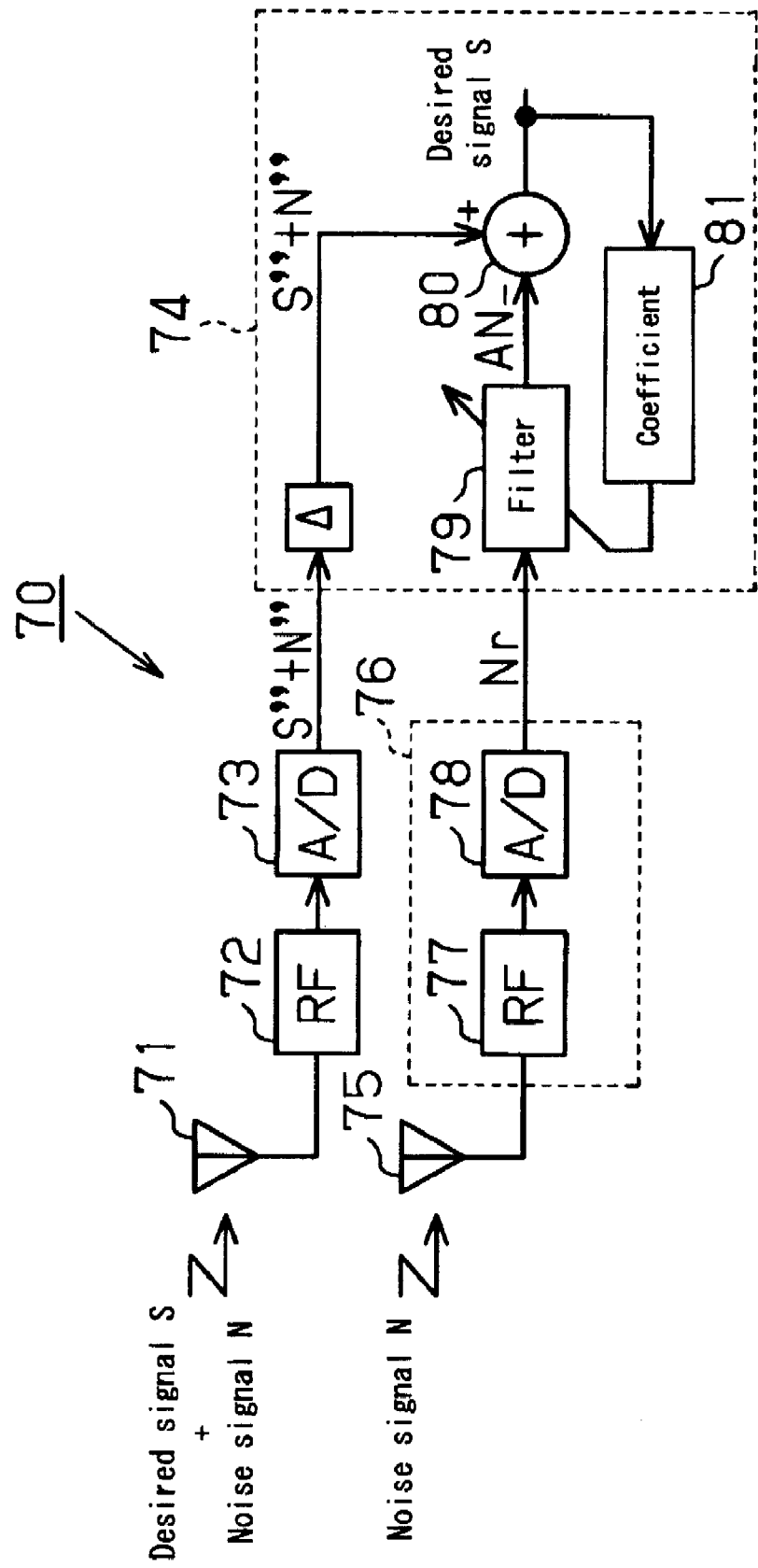
FIG. 5 is a block view illustrating a known digital signal receiving apparatus.

FIG. 4 is a timechart for explaining one example illustrating a transit of the smoothed signals A1(t) and A2(t) in a state for receiving a desired signal. As illustrated in FIG. 4, when an interfering-wave filtered signal e1 (correlation signal X(t)) changes greatly, such as when a desired signal is received, the smoothed signal A1(t) rises immediately after receiving the desired signal, corresponding to the first smoothing filter 19a possessing a fast convergence speed. Meanwhile, the smoothed signal A2(t) rises gradually after receiving the desired signal, corresponding to the second smoothing filter 19b possessing a slow convergence speed. Therefore, when a desired signal is received, a level of the smoothed signal A1(t) turns greater than that of the smoothed signal A2(t) (reference level). As a result, the comparator 19c outputs a detection signal representing "judgment of a possible presence of a desired signal".

Further, in a signal receiving state, even when the first smoothing filter 19a responds to a pulse-shaped interfering wave contained and the level of the smoothed signal A1(t) turns below that of the smoothed signal A2(t), because the fluctuation width is limited as described above, it is possible to prevent "judgment of a possible presence of a desired signal" from being erased or changed erroneously.

Figure 3:
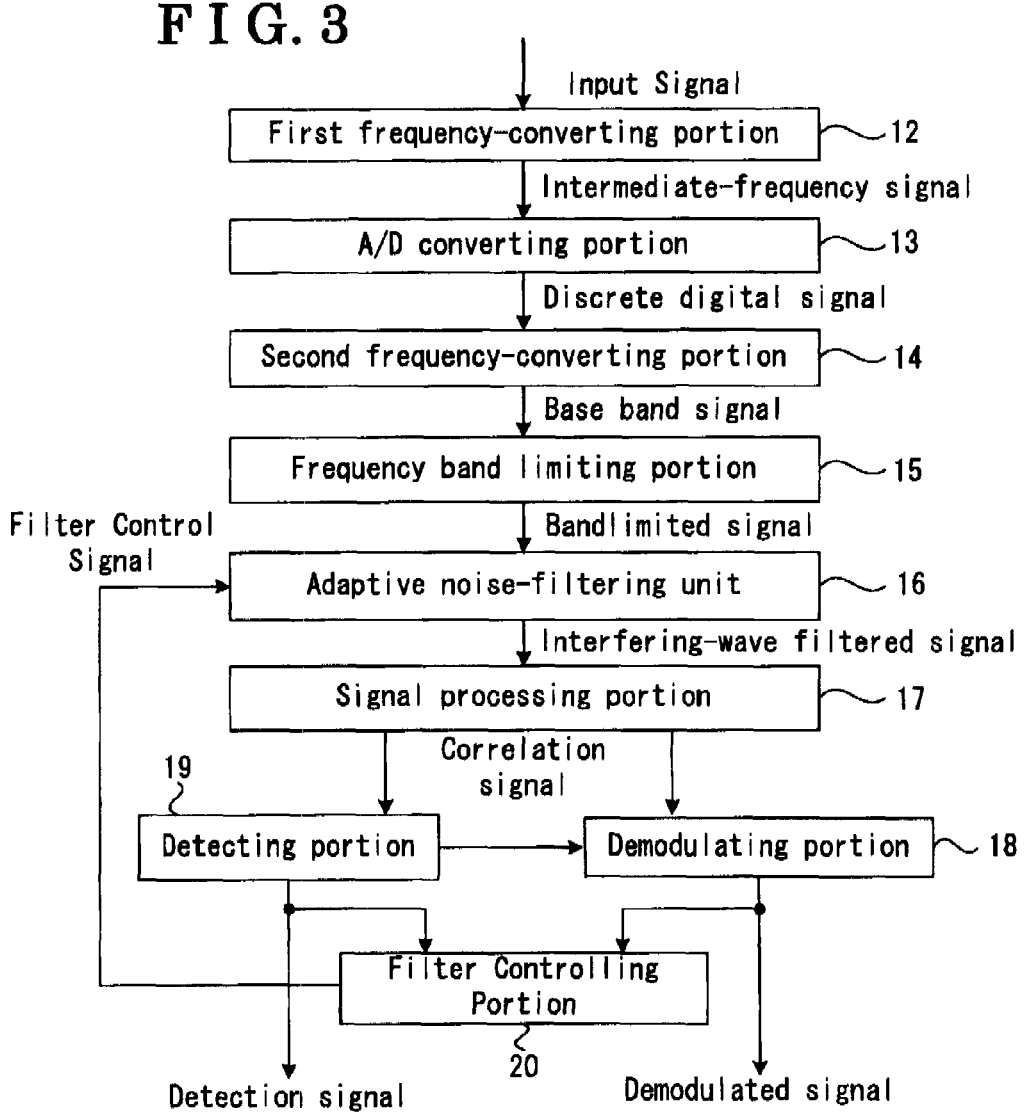
FIG. 3 is a block view for schematically illustrating a signal processing according to the embodiment.

Next, an example of a signal processing according to the embodiment will be generally described below with reference to FIG. 3.

As illustrated, a signal inputted to the digital signal receiving apparatus 10 via the antenna 11 is outputted as an intermediate-frequency signal by the first frequency-converting portion 12. The intermediate-frequency signal is outputted as a discrete digital signal by the A/D converting portion 13. The discrete digital signal is outputted as a base band signal by the second frequency-conventing portion 14. The base band signal is outputted as a bandlimited signal (received signal X1) by the frequency-band limiting portion 15. The bandlimited signal is obtained or extracted as an interfering-wave filtered signal e1 by the adaptive noise-filtering unit 16 adapted to remove or filter out an interfering wave.

Secondly, the interfering-wave filtered signal e1 is outputted as a correlation signal X(t) by the signal-processing portion 17 configured to calculate an autocorrelation of the interfering-wave filtered signal e1. The correlation signal X(t) is outputted as a demodulated signal by the demodulating portion 18 configured to demodulate a desired signal based upon the correlation signal. The correlation signal is outputted further as a detection signal by the detecting portion 19, which judges a possible presence of a desired signal and an absence of a desired signal, based upon the correlation signal. In the detecting portion 19, even when a pulse-shaped interfering wave is contained, it is possible to prevent "judgment of a possible presence of a desired signal" from being erased or changed erroneously, as described above. The demodulated signal and the detection signal are both outputted to the filter-controlling portion 20, and a filter control signal is generated by the filter controlling portion 20 to be outputted to the adaptive noise-filtering unit 16. As described above, the adaptive noise-filtering unit 16 (adaptive filtering portion 16a) is controlled in a stable manner.

As described above, the following effects are generated according to the embodiment.

(1) According to the embodiment, in a signal receiving state for receiving a desired signal (after judging a possible presence of a desired signal), even where the first smoothing filter 19a responds to a pulse-shaped interfering wave contained and the level of the smoothed signal A1(t) turns below a reference level (a level of the smoothed signal A2(t)), because the limiter 24 limits the fluctuation width of the desired signal, it is possible to prevent the detecting portion 19 (comparator 19c) from erroneously changing the judgment of a possible presence of a desired signal. As a result, it is possible to prevent the filter controlling portion 20 from erroneously switching the adaptive filtering portion 16 from a non-adaptive mode to an adaptive mode and to prevent the adaptive filtering portion 16 from erroneously learning a desired signal as a correlated ambient noise. Therefore, the demodulating portion 18 demodulates a desired signal based upon the correlation signal X(t) more accurately. The fluctuation width of the smoothed signal A1(t) limited by the limiter 24 is adjusted to be reduced as an elapsing time is increasing after judging a possible presence of a desired signal. That is, the fluctuation width of the smoothed signal A1(t) limited by the limiter 24 is adjusted to the maximum level immediately after judging a possible presence of a desired signal. Therefore, it is possible to prevent rising of the smoothed signal A1(t) from unnecessarily being restrained at an initial timing of receiving the desired signal and to implement quickly a judgment of a presence of a possible presence of a desired signal.

(2) According to the embodiment, the selector 21 adjusts the fluctuation width of the smoothed signal A1(t) limited by the limiter 24 in a multiple-stepped manner. As a result, for example, a calculating load is reduced compared to a case where the fluctuation width is adjusted every calculating cycle.

(3) As described above, at an initial stage immediately after judging a possible presence of a desired signal, the limiter 24 can stop limiting the fluctuation width of the smoothed signal A1(t). In this case, it is possible to allow the smoothed signal A1(t) from rising in response to a start of receiving a desired signal. Therefore, it is possible to prevent the fluctuation width of the smoothed signal A1(t) from unnecessarily being limited until reliability of a judgment of a possible presence of a desired signal is enhanced.

(4) According to the embodiment, a dynamic level of the correlation signal X(t) (smoothed signal A2(t)), which is smoothed by the second smoothing filter 19b, is employed as a reference level for judging a possible presence of a desired signal. Therefore, a judgment of a possible presence of a desired signal is implemented properly along with an environment such as ambient noise.

(5) In a case where a signal being received is not a desired signal even if "judgment of a possible presence of a desired signal" is implemented, the filter controlling portion 20 switches an actual mode of the adaptive noise-filtering unit 16 from a non-adaptive mode to an adaptive mode. Accordingly, updating of the filter coefficient by the adaptive noise-filtering unit 16 is resumed, and a signal being received, which is not a desired signal, is filtered out as ambient noise.

(6) In a non-adaptive mode, the adaptive noise-filtering unit 16 uses a filter coefficient updated for the purpose of filtering out a correlated ambient noise during an adaptive mode and filters out ambient noise. Therefore, even when the ambient noise is correlated to a desired signal in a situation where the FSK digital signal receiving apparatus 10 is in a signal-receiving state for receiving a desired signal, the adaptive noise-filtering unit 16 filters out the ambient noise not the desired signal. As a result, it is possible to receive the desired signal appropriately. Further, even if the ambient noise is correlated to the desired signal, the adaptive noise-filtering unit 16 is enabled to selectively receive either the ambient noise or the desired signal by the filter controlling portion 20 controlling the adaptive noise-filtering unit 16 to switch between an adaptive mode and a non-adaptive mode. In this case, being compared with a case in which a circuit configured to receive an ambient noise and a desired signal selectively, the adaptive noise-filtering unit 16 can be a circuit with a reduced size. For example, it is possible to omit an antenna for receiving a noise signal and a noise signal outputting circuit, as described in reference 1.

(7) The detecting portion 19 implements "judgment of a possible presence of a desired signal", which switches the adaptive noise-filtering unit 16 from an adaptive mode to a non-adaptive mode. Therefore, it is possible for the filter controlling portion 20 to discontinue updating the filter coefficient without waiting for a judgment of a signal being received between an ambient noise and a desired signal. Therefore, the desired signal is prevented from being reflected to a filter coefficient as an ambient noise until the signal being received is identified as the desired signal. The desired signal is further prevented from being filtered out after the signal being received is identified as the desired signal. That is, until the signal being received is identified as the desired signal, the desired signal is prevented from being generated as a noise-canceling signal, thereby enabling to prevent deterioration of sensitivity in receiving a desired signal.

(8) For example, in a case of an analog signal receiver, when an interfering wave exists within a band, amplitude of a desired wave (FSK signal) needs to be greater than that of the interfering wave (noise). When the amplitude of the desired wave is smaller than that of the interfering wave, the desired wave may not be demodulated. Meanwhile, because a digital signal receiving apparatus is employed according to the embodiment, even under a circumstance where amplitude of the noise is greater than that of the FSK signal, it is possible to demodulate the FSK signal.

The embodiment may be modified as described below.

According to the embodiment, the smoothed signal $A2(t)$ is employed as a reference level for the purpose of implementing "judgment of a possible presence of a desired signal". In this case, the smoothed signal $A2(t)$ can be a fixed or variable value. Alternatively, a predetermined and fixed reference level can be employed in stead of the smoothed signal $A2(t)$.

According to the embodiment, the FSK digital signal receiving apparatus 10 includes the adaptive noise-filtering unit 16. Alternatively, another adaptive noise-filtering unit may be added, which filters out a non-correlated ambient noise.

According to the embodiment, the FSK digital signal receiving apparatus 10 is employed as a digital signal receiving apparatus. Alternatively; an ASK (Amplitude Shift Keying) or PSK (Phase Shift Keying) digital signal receiving apparatus can be employed, as a non-limiting example.

The digital signal receiving apparatus mentioned above is applicable to a vehicle. In this case, the digital signal receiving apparatus may be operatively associated with a radio communication with a transmitter carried by a user, so that an electronically driven locking and unlocking of a door of the vehicle, an engine start or an engine stop is confirmed. Further, the digital signal receiving apparatus may be operatively associated with a radio communication with a transmitter carried by a user, so that actuations of electric apparatuses, such as a power window apparatus, a slide door apparatus, a sun roof apparatus are controlled. That is, the digital signal receiving apparatus can be applicable to systems in which a non-communication state (signal-receiving standby state) of a desired signal exists.

According to an aspect of the present invention, a digital signal receiving apparatus includes: an adaptive filter receiving a signal and adapted to switch between an adaptive mode for updating successively a filter coefficient thereof and for filtering out a correlated ambient noise from the signal by use of the filter coefficient and a non-adaptive mode for discontinuing updating of the filter coefficient and for filtering out the correlated ambient noise from the signal by use of the filter coefficient updated in the adaptive mode; a signal processing portion generating an auto-correlation signal based upon the received signal from which the correlated ambient noise is filtered out by the adaptive filter; a detection-judging portion having a first smoothing filter generating a first smoothed signal by smoothing the auto-correlation signal the detection-judging portion judging a possible presence of the desired signal in the signal when a signal level of the first smoothed signal is greater than a reference level and an absence of a desired signal in the signal when the signal level of the smoothed signal is smaller than the reference level and a filter controlling portion switching an actual mode of the adaptive filter from the adaptive mode to the non-adaptive mode when the detection-judging portion judges the possible presence of the desired signal and switching the actual mode of the adaptive filter from the non-adaptive mode to the adaptive mode when the detection-judging portion judges the absence of the desired signal. The smoothing filter includes: a limiting portion limiting a fluctuation width of the first smoothed signal and an adjusting portion configured to adjust the fluctuation width of the first smoothed signal limited by the limiting portion to be reduced while an elapsing time after the detection-judging means judges the possible presence of the desired signal is increasing.

So configured, in a signal receiving state for receiving a desired signal (after judging a presence of a possible detection of a desired signal), even where the first smoothing filter responds to a pulse-shaped interfering wave contained and the level of the first smoothed signal turns below the reference level, because the limiting portion limits the fluctuation width of the desired signal, it is possible to prevent the detecting portion from erroneously changing the judgment of a possible presence of a desired signal. As a result, it is possible to prevent the filter controlling portion from erroneously switching the adaptive filter from a non-adaptive mode to an adaptive mode and to prevent the adaptive filter from erroneously learning a desired signal as a correlated ambient noise. The fluctuation width of the first smoothed signal limited by the limiting portion is adjusted to be reduced as an elapsing time is increasing after judging a possible presence of a desired signal. That is, the fluctuation width of the smoothed signal limited by the limiting portion is adjusted to the maximum level immediately after judging a possible presence of a desired signal. Therefore, it is possible to prevent rising of the smoothed signal from unnecessarily being restrained at an initial timing of receiving the desired signal and to implement quickly a judgment of a possible presence of a desired signal.

The adjusting portion adjusts the fluctuation width of the smoothed signal limited by the limiting portion in a multiple-stepped manner. As a result, for example, a calculating load is reduced compared to a case where the fluctuation width is adjusted every calculating cycle.

The adjusting portion is configured to stop the limiting portion tom limiting the fluctuation width of the smoothed signal at an initial step immediately after the detection-judging portion judges the possible presence of the desired signal.

So configured, at an initial stage immediately after judging a possible presence of a desired signal, the adjusting portion stops the limiting portion from limiting the fluctuation width of the smoothed signal. In this case, it is possible to allow the smoothed signal from rising in response to a start of receiving a desired signal. Therefore, it is possible to prevent the fluctuation width of the smoothed signal from unnecessarily being limited until reliability of a judgment of a possible presence of a desired signal is enhanced.

The detection-judging portion further includes a second smoothing filter generating a second smoothed signal by smoothing the auto-correlation signal at a convergence speed slower than that of the first smoothing filter. The reference level is the second smoothed signal.

So configured, a dynamic level of the correlation signal (second smoothed signal), which is smoothed by the second smoothing filter, is employed as a reference level for judging a possible presence of a desired signal. Therefore, a judgment of a possible presence of a desired signals implemented properly along with an environment such as ambient noise.

As described above, it is possible to provide a digital signal receiving apparatus which can implement accurately a judgment of a possible presence of a desired signal and can prevent the adaptive filter from erroneously learning the desired signal even where a pulse-shaped interfering wave is contained.

The digital signal receiving apparatus further includes a demodulating portion demodulating the auto-correlation signal and generating a demodulated signal. The filter controlling portion judges, based upon the demodulated signal, whether a signal being received is the desired signal. When the signal being received is not the desired signal, the adaptive filter is switched from the non-adaptive mode to the adaptive mode. In this case, when the signal being received is not the desired signal even when the filter controlling portion judges a possible presence of a desired signal, the filter controlling portion switches the adaptive filter from the non-adaptive mode to the adaptive mode. Therefore, updating of the filter coefficient of the adaptive filter is resumed, thereby enabling to filter out a signal being received (not a desired signal) as an ambient noise.

The invention claimed is:

1. A digital signal receiving apparatus comprising:
   an adaptive filter receiving a signal and adapted to switch between an adaptive mode for updating successively a filter coefficient thereof and for filtering out a correlated ambient noise from the signal by use of the filter coefficient and a non-adaptive mode for discontinuing updating of the filter coefficient and for filtering out the correlated ambient noise from the signal by use of the filter coefficient updated in the adaptive mode;
   a signal processing portion generating an auto-correlation signal based upon the received signal from which the correlated ambient noise is filtered out by the adaptive filter;
   a detection-judging portion having a first smoothing filter generating a first smoothed signal by smoothing the auto-correlation signal, the detection-judging portion judging a possible presence of a desired signal in the signal when a signal level of the first smoothed signal is greater than a reference level and an absence of the desired signal in the signal when the signal level of the smoothed signal is smaller than the reference level;
   a filter controlling portion switching an actual mode of the adaptive filter from the adaptive mode to the non-adaptive mode when the detection-judging portion judges the possible presence of the desired signal and switching the actual mode of the adaptive filter from the non-adaptive mode to the adaptive mode when the detection-judging portion judges the absence of the desired signal; and
   the smoothing filter including:
      a limiting portion limiting a fluctuation width of the first smoothed signal; and
      an adjusting portion configured to adjust the fluctuation width of the first smoothed signal limited by the limiting portion to be reduced while an elapsing time after the detection-judging means judges the possible presence of the desired signal is increasing.

2. A digital signal receiving apparatus according to claim 1, wherein the adjusting portion adjusts the fluctuation width of the smoothed signal limited by the limiting portion in a multiple-stepped manner.

3. A digital signal receiving apparatus according to claim 2, wherein the adjusting portion is configured to stop the limiting portion from limiting the fluctuation width of the smoothed signal at an initial step immediately after the detection-judging portion judges the possible presence of the desired signal.

4. A digital signal receiving apparatus according to claim 1, wherein the detection-judging portion further includes a second smoothing filter generating a second smoothed signal by smoothing the auto-correlation signal at a convergence speed slower than that of the first smoothing filter, the reference level is the second smoothed signal.

* * * * *